Feb. 1, 1949.   W. F. KINNEY   2,460,296
MECHANISM FOR FORMING VENTED CAN END SEAMS
Filed June 27, 1946
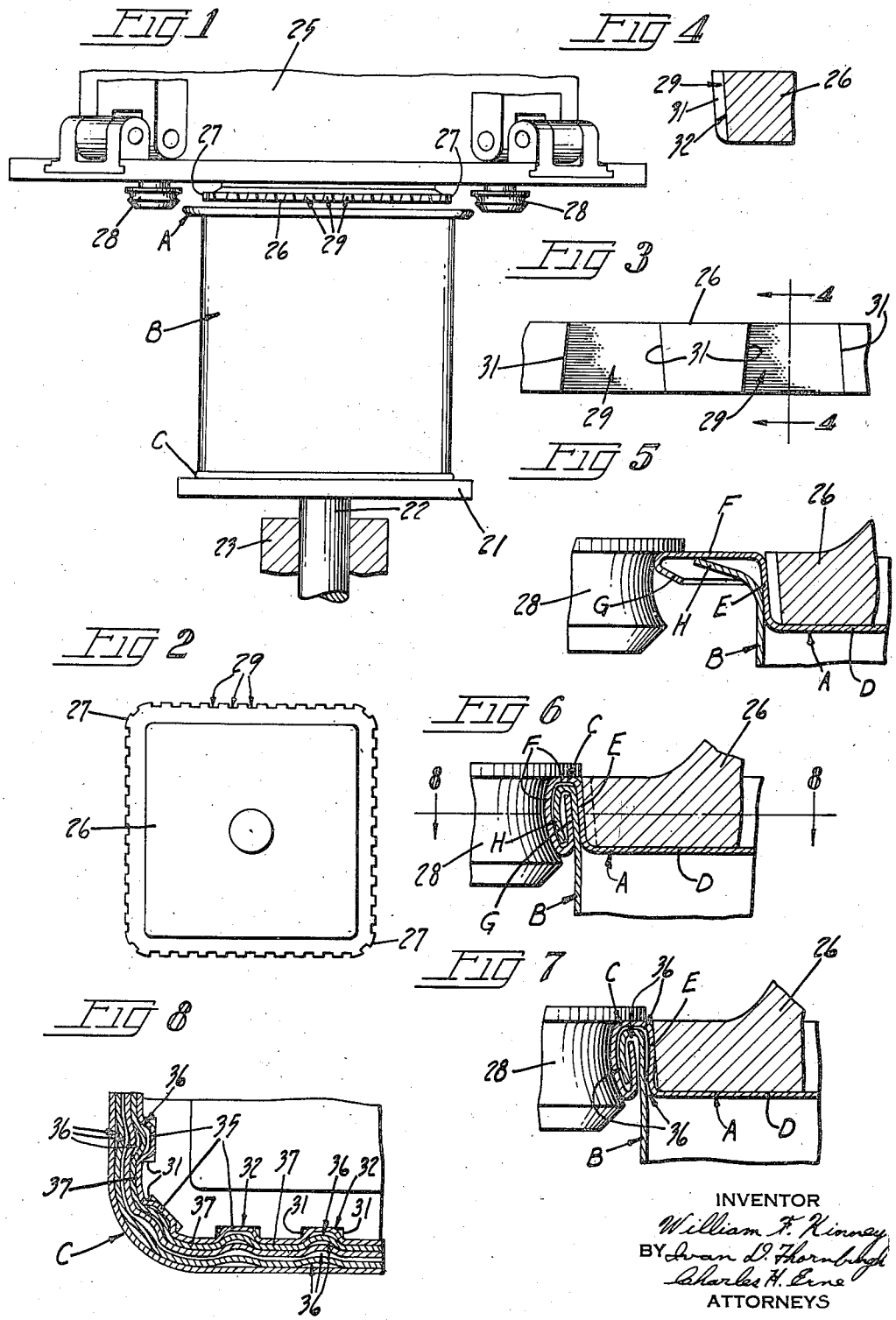

Patented Feb. 1, 1949

2,460,296

UNITED STATES PATENT OFFICE 2,460,296

MECHANISM FOR FORMING VENTED CAN END SEAMS

William F. Kinney, Maywood, Ill., assignor to American Can Company, New York, N. Y., a corporation of New Jersey Application June 27, 1946, Serial No. 679,830

3 Claims. (Cl. 113—19)

The present invention relates to a machine for making cans or containers and has particular reference to an improved mechanism for forming vented interfolded end seams or joints which are adapted to be soldered for permanently securing the end closure members to the bodies of the cans.

In the manufacture of certain kinds of cans, such as for example large square cans used for oils, etc., the end seams of the cans are often of the well known double seam type formed by an interfolding of flange parts on the can body and the end closures. Such seams in large cans are usually soldered in order to strengthen the seams and to guard against rupture during handling of the cans after filling. The penetrating nature of some oils also requires soldering of the end seams instead of using compound gaskets in the seams.

In soldering such seams, air and other gases are often trapped in the folds of the seams and this air prevents proper distribution of the solder throughout the seam parts. Thus there results an improperly soldered and weak seam which is incapable of withstanding strains and stresses without rupture.

The instant invention contemplates overcoming these difficulties by providing for the venting of the end seams or joints to permit the escape of entrapped air or other gases and thereby insures proper distribution of the solder throughout the end seam parts.

An object of the invention is the provision of a mechanism for forming an end seam joint on a can by an interfolding of flange parts of the can body and its end closures wherein venting passageways are formed in the seam joint simultaneously with the formation of the joint so that subsequent soldering of the joint will result in full distribution of the solder throughout the seam parts, thereby insuring proper bonding and reenforcement of the seam parts.

Another object is the provision of such a mechanism wherein the venting passageways are formed in the end seam by compressing the interfolded flange portions loosely at selected places along the joint and relatively tighter along the remaining portions of the joint, the spaces between the layers of the seam at the loosely compressed portions of the joint providing the passageways for venting the seam.

Another object is the provision of such a mechanism wherein a serrated chuck is utilized in cooperation with a seaming roller for performing the seaming operation, the serrations of the chuck being formed with tapered defining walls to facilitate removal of the chuck from the can after completion of the seaming operation.

Numerous other objects and advantages of the invention will be apparent as it is better understood from the following description, which, taken in connection with the accompanying drawings, discloses a preferred embodiment thereof.

Referring to the drawings:

Figure 1 is a side view of an end seam forming mechanism embodying the instant invention, with parts shown in section, the view showing a can just before being brought into place for seaming;

Fig. 2 is a bottom plan view of the chuck of the mechanism shown in Fig. 1;

Fig. 3 is an enlarged edge view of a portion of the chuck shown in Fig. 2;

Fig. 4 is a fragmentary section taken substantially along the line 4—4 in Fig. 3;

Figs. 5, 6 and 7 are enlarged sectional details of portions of the can and the mechanism shown in Fig. 1, with parts broken away and parts in different positions incidental to producing the end seam; and Fig. 8 is a sectional view of one corner of the can and taken through the seam substantially along the line 8—8 in Fig. 6.

As a preferred embodiment of the instant invention the drawings illustrate a mechanism for securing sheet metal square end closure members A (Figs. 1 and 5) to sheet metal square tubular can bodies B by an interfolding of flange parts of the end closures and the body. This is done in a manner to produce vented end seam joints C (Figs. 6 and 7).

The end closures A are preferably of the countersunk panel type having a square bottom panel D (Fig. 5) formed with rounded corners. This panel is surrounded by a short upright wall section E. The upper edge of the upright wall section E merges into an outwardly projecting flange F which extends completely around the end closure. The outer periphery of the flange terminates in a curled edge G.

The can body B adjacent its open ends is formed with outwardly extending inclined flanges H which completely surround the body.

When an end closure A is in place on a can body B for seaming, the countersunk panel of the end closure fits snugly within the open end of the can body, as best shown in Fig. 5. In this position of the closure on the body, the upright wall section E of the closure engages against the inner surface of the body and the closure flange F overlies the body flange H.

The mechanism for effecting the seaming operation preferably includes a reciprocable lifter pad 21 (Fig. 1) which is mounted on the upper end of a vertical actuating rod 22 carried in a bearing 23 which may be a part of the main frame of the machine. The lifter pad is disposed below and in alignment with a rotatable seaming head 25. This seaming head preferably is of the type disclosed in United States Patent 1,716,618, issued June 11, 1929, to H. L. Bryant on Can closing machine.

The seaming head 25 includes a stationary square chuck 26 (see also Fig. 2) having rounded corners 27 and a plurality of seaming rollers 28 (Fig. 1) which are movable toward and away from the chuck and around the chuck for performing the seaming operation as explained in the above mentioned Bryant patent. The outer peripheral surface of the chuck of the present invention for the full depth of its seam engaging part is formed with a plurality of closely spaced serrations or recesses 29 having sharp corners, there being at least one of these serrations located at each rounded corner 27 of the chuck.

The defining side walls of these serrations 29 preferably are tapered along lines 31 (Fig. 3) so that the width of the serrations at the outer or bottom edge of the chuck is greater than that at the top edge thus forming recesses of trapezoidal shape. The defining back wall of each trapezoidal recess is also tapered inwardly along a line 32, as shown in Fig. 4. These tapered defining walls of the serrations are provided to facilitate removal of the chuck from the can upon completion of the seaming operation.

In operation, a can body B with a closure member A loosely applied thereto in the usual manner is deposited on the lifter pad 21 as in the position of Fig. 1. Then the pad is elevated to bring the upper end of the body with its closure member into the rotating head 25. During this elevating operation the chuck 26 seats within the countersunk panel of the closure member, the outer serrated peripheral surface of the chuck engaging and backing up the upright wall section E of the closure member, as best shown in Fig. 5. In this position the chuck holds the closure member in place on the can body.

With the chuck 26 in seated position, the seaming rollers 28 of the rotating head 25 move in against the outer periphery of the flange F of the closure member A. This bends the flange inwardly in the usual seaming operation as the rollers revolve around the chuck. This inward bending of the flange F under pressure of the seaming rollers interfolds this flange and the curled portion G of the closure member A with the flange H of the body B while the body wall and the upright wall section E of the closure member are backed up by the chuck. This bending or interfolding of the flange parts results in the double seam joint C (Figs. 6 and 7).

At the serrations 29 in the chuck 26 the seaming rollers 28 press the upright wall section E of the closure member and the adjacent interfolded sections of the seam joint inwardly beyond the inner peripheral surface of the seam while maintaining the outer peripheral surface substantially smooth. This extruding action produces projections 35 (Fig. 8), on the peripheral surface of the seam. By reason of the sharp corners of the recesses, the different layers of the seam parts entering the recesses assume different cross sectional shapes and leave irregular shaped openings between the layers, as clearly seen in Fig. 8. This results in loosely interfolded seam sections having venting passageways or channels 36 disposed between the seam parts. The projections 35 are tapered on their edges and inner faces in accordance with the tapered outlines 31, 32 of the serrations in the chuck and this permits of easy removal of the chuck from the can when the seam is completed, as hereinbefore mentioned.

Between the projections 35 the seam parts are tightly pressed together in the usual double seam manner as indicated by the numeral 37 (Fig. 8). Thus the end seam joint along its entire length is provided with alternate tight and loose seam sections. The loose sections provide the continuous venting channels extending through the seam transversely thereof from the exterior of the can to its interior.

Upon completion of the seaming operation, the seam joint is soldered in the usual manner by the application of molten solder to the outside of the seam at a place adjacent the can body. During such soldering operation the venting channels in the loose sections of the seam join permit of the escape of any trapped air or soldering gases from the joint and thereby insures proper distribution of the solder throughout the seam parts. It is this distribution of the solder that bonds the seam parts together in a hermetic joint. Such complete soldering also reenforces the seam joint against rupture during handling of the subsequently filled cans.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a mechanism for securing a flanged end closure member to a flanged container body in a vented double seam end joint adapted to be subsequently soldered, the combination of a chuck insertable into an end closure member assembled with a container body, said chuck having sharp cornered recesses extending transversely across its seam engaging peripheral surface, and a smooth-surfaced seaming roller adjacent said chuck for pressing the seam parts against said chuck surface to form the double seam, the chuck recesses having sufficient width that the action of the roller against the double seam at the recessed portions of the chuck will disturb the normal relative position of the inner layers of the seam to provide vent sections for subsequent soldering of the seam.

2. In a mechanism for securing a flanged end closure member to a flanged container body in a vented end seam joint adapted to be subsequently soldered, the combination of a chuck insertable into an end closure member assembled with a container body, said chuck having a seam engaging peripheral surface, sharp cornered recesses formed in said chuck surface at spaced intervals and extending transversely across said chuck peripheral surface, each recess having a back wall sloping inwardly toward the outer edge of the chuck and side walls diverging toward the outer edge of the chuck to facilitate removal of the seam from the chuck after seaming, and a seaming roller adjacent said chuck for pressing the seam parts against the recessed peripheral surface of the chuck to form the seam and to bend adjacent portions thereof into the recesses and over the sharp corners to separate the seam layers and to provide loose seam vent sections for subsequent soldering of the seam.

3. In a mechanism for securing a rectangular flanged end closure member having rounded corners to a rectangular flanged container body of like shape in a vented end seam joint adapted to be subsequently soldered, the combination of a rectangular rounded cornered chuck insertable into an end closure member assembled with a container body, said chuck having a seam engaging peripheral surface including alternately disposed sharp cornered recesses and backing up sections extending transversely across said chuck peripheral surface, with a recess substantially centered on each corner of said surface, and a seaming roller adjacent said chuck for pressing the seam parts against said chuck surface to form the seam and to bend adjacent portions thereof into the recesses to provide loose seam vent sections for subsequent soldering of the seam.

WILLIAM F. KINNEY.

REFERENCES CITED

The following references are of record in the file of this patent:

UNITED STATES PATENTS

| Number | Name | Date |
| --- | --- | --- |
| 1,469,334 | Ross | Oct. 2, 1923 |
| 1,867,857 | Meyers | July 19, 1932 |
| 2,137,245 | Junkunc | Nov. 22, 1938 |
| 2,181,237 | Ives | Nov. 28, 1939 |
| 2,321,408 | Mills | June 8, 1943 |